United States Patent Office

2,721,851
Patented Oct. 25, 1955

2,721,851

THERMALLY STABLE POLYSULFONE RESINS

Robert J. Fanning, Borger, Tex., assignor to Phillips Petroleum Company, a corporation of Delaware No Drawing. Application November 10, 1952,
Serial No. 319,788

28 Claims. (Cl. 260—29.2)

This invention relates to new heteropolymeric resin compositions and their preparation. In one aspect, this invention relates to a method for producing thermally stable polysulfone resins. In another aspect, this invention relates to incorporating certain naphthalenethiols in polysulfone resins. In still another aspect, this invention relates to a polysulfone resin which is resistant to thermal decomposition.

The following objects will be obtained by the aspects of this invention. It is an object of this invention to provide a method for rendering polysulfone resins resistant to thermal decomposition. It is another object to provide a thermally stable polysulfone resin composition. It is still another object to provide a method for producing a thermally stable polysulfone resin. It is still another object to provide a novel polysulfone latex. It is still another object to provide a polysulfone resin composition which can be employed in an injection molding operation without causing decomposition of the resin. Other objects will be apparent to one skilled in the art upon reading the disclosure of this invention.

Polysulfone resins often cannot be employed satisfactorily for the production of molded articles because of their limited thermal stability. On being exposed to elevated temperatures, the original glass-like resin evolves sulfur dioxide, unsaturated organic compounds and various volatile decomposition products of unpleasant odor, expanding into a porous, voluminous mass having a puffy structure.

Various so-called stabilizing agents have been suggested as additives for polysulfone resins. These additives include organic solvent liquids and vapors, acrylic acid esters, vinyl acetate and acylating agents which supposedly act to remove occluded sulfur dioxide. When heated to the elevated temperatures necessary for injection molding operations, such as 300° F. or higher, these stabilizing agents become essentially ineffective and the resins containing them are substantially as unstable as in their absence.

More recently it has been disclosed that polysulfone resins may be stabilized and rendered highly resistant to thermal decomposition if an organic compound containing at least one sulfhydryl group is incorporated therein as a stabilizing agent. However, I have found that some organic compounds containing a sulfhydryl group have no practical stabilizing effect upon polysulfone resins as indicated by a high weight loss upon being heated. I have found that a polysulfone resin composition containing 2 weight per cent of 6-methoxy-2-benzimidazolethiol is actually more readily decomposed at 375° F. than is an untreated control sample of this polysulfone resin.

I have discovered that polysulfone resins can be rendered resistant to thermal decomposition when certain naphthalenethiols are incorporated therein as a stabilizing agent. When added to a polysulfone resin according to the method of our invention these naphthalenethiols impart excellent thermal stability to said resins.

According to this invention there is provided a process for the production of thermally stable polysulfone resins which comprises adding to said resin, prior to the molding step, a naphthalenethiol selected from the group consisting of 1-naphthalenethiol and 2-naphthalenethiol.

In order to effect a high degree of stabilization from 0.2 to 10, preferably 0.5 to 5 weight per cent, based on the weight of the resin, of 1-naphthalenethiol or 2-naphthalenethiol, or a mixture of such compounds, is incorporated in the molding composition employed.

The stabilization agents of the present invention can be incorporated into polysulfone resins in a number of ways to accomplish the high degree of thermal stabilization of the present invention. It is important that the compounds be thoroughly and intimately mixed with the resin. Thus, for example, the stabilization agent can be dissolved in methanol, benzene, ethanol, or other suitable solvent and slurried with a dry, powdered, resin and the solvent subsequently removed by evaporation. The stabilization agents of the present invention may also be added in finely-divided form to an aqueous dispersion of the resin in which the latter was prepared and both the resin and stabilizer precipitated therefrom simultaneously. An aqueous dispersion of the stabilization agent can also be added to a neutral latex and both the stabilization agent and resin precipitated therefrom simultaneously. An aqueous dispersion of the stabilization agent can also be added to a neutral latex and both the stabilization agent and resin precipitated therefrom simultaneously to form stable resin compositions.

The stabilization agents employed in the present invention are applicable to the stabilization of polysulfone resins produced by any method such as emulsion polymerization or polymerization in excess sulfur dioxide or acetone or other suitable solvent. A method for producing said resins by emulsion polymerization is disclosed in copending application Serial No. 8,755, filed February 16, 1948, by W. W. Crouch and E. W. Cotten, now U. S. Patent 2,645,631.

Unsaturated organic compounds which enter into the formation of polysulfone resins comprise those compounds wherein the unsaturation is an olefinic double bond or a triple bond between two adjacent carbon atoms. Such compounds include olefinic hydrocarbons, such as propene, 1-butene, 2-butene, isobutylene, amylenes, hexenes, cyclo-hexenes, heptenes, cyclo-heptenes, octenes, cyclo-octenes, nonenes, decene, undecene, dodecene, etc., diolefins such as butadiene, pentadiene, hexadiene, cyclohexadiene, isoprene, and the like, acetylenes and polyfunctional unsaturated compounds such as allyl alcohol, vinyl acetate, allyl ethyl ether, o-allylanisole, o-allylphenol, p-bromoallyl-benzene, methyl undecylenate, undecyleneyl alcohol, undecylenic acid, acrylonitrile, ethyl acrylate, etc. Mixtures of the above compounds can also be reacted with sulfur dioxide to form polysulfone resins.

EXAMPLE I

A polysulfone resin was prepared using the following emulsion recipe in a stainless steel autoclave:

| | Parts by weight |
|---|---|
| Technical 1-butene [1] | 46.7 |
| Sulfur dioxide | 88.3 |
| Water | 220 |
| Ammonium nitrate | 0.5 |
| Maprofix MM [2] | 1.0 |

[1] Contained a minimum of 95 mol percent of 1-butene.
[2] Sodium laurylsulfate dispersing agent commercially available in the form of a paste containing about 60 per cent solids.

The polymerization was conducted for a period of 4.83 hours at a temperature of 100° F. A conversion of 96.2 per cent was reached.

At the end of the reaction period, excess sulfur dioxide was vented from the reactor. To effect coagulation of the resin from the latex, approximately 1 part by weight of 20 wt. per cent aqueous sodium chloride and 1 part by weight of methanol were added to 2 parts of the latex. The resin particles were separated from the liquid, washed with water, and dried in air at 130–150° F. for 16 hours.

EXAMPLE II

A solution of 2-naphthalenethiol in benzene was added to a sample of powdered resin prepared as described in the foregoing example. After thoroughly commingling the resin and stabilizer solution, the solvent was removed by evaporation. The amount of 2-naphthalenethiol applied was equivalent to 2 weight per cent of the resin.

This treated resin and an untreated control were tested for thermal stability in the following manner: Two or three grams of resin was placed in a test tube which was then partially immersed in a constant temperature bath held at $375 \pm 2°$ F. for a total of three hours. Per cent loss in weight of the resin was determined at the end of 0.5, 1 and 3 hours. The per cent loss in weight provides a measure of the thermal decomposition which took place. Results of tests are recorded in the following table:

|  | Percent loss in weight at end of x hours heating at $375 \pm 2°$ F. | | |
| --- | --- | --- | --- |
|  | 0.5 | 1 | 3 |
| Sample I: | | | |
| Control | 16.3 | 24.5 | 37.1 |
| 2 wt. percent 2-naphthalenethiol | 1.5 | 2.7 | 5.7 |
| Sample II: | | | |
| Control | 16.7 | 23.8 | 35.8 |
| 0.25 wt percent 2-naphthalenethiol | 7.2 | 12.4 | 23.6 |
| 0.5 wt. percent 2-naphthalenethiol | 5.5 | 10.1 | 21.1 |
| 1.0 wt. percent 2-naphthalenethiol | 4.0 | 6.9 | 16.1 |
| 2.0 wt. percent 2-naphthalenethiol | 2.9 | 4.9 | 11.3 |

EXAMPLE III

The following run wherein 6-methoxy-2-benzimidazolethiol was employed as stabilization agent for a polysulfone resin prepared in the manner described above, demonstrates the inoperability of said compound. These data demonstrate that not all organic compounds which contain a sulfhydryl group are efficacious thermal stabilization agents for polysulfone resins.

| Stabilizer | Percent loss in weight at end of x hours heating at $375 \pm 2°$ F. | | |
| --- | --- | --- | --- |
|  | 0.5 | 1 | 3 |
| Control | 12.8 | 18.3 | 30.5 |
| 2 wt. percent 6-methoxy-2-benzimidazolethiol | 15.6 | 52.9 | 52.5 |

Reasonable variations and modifications are possible within the scope of the disclosure of the present invention, the essence of which is that 1-naphthalenethiol and 2-naphthalenethiol have been found to impart thermal stability to polysulfone resins and polysulfone resins have been so stabilized.

I claim:

1. In the process of producing a polysulfone resin formed by the interaction of sulfur dioxide and an unsaturated organic compound, wherein the unsaturation is an olefinic double bond between two adjacent carbon atoms and which will polymerize with sulfur dioxide to form a resin, the improvement which comprises adding to said resin a material selected from the group consisting 1-naphthalenethiol and 2-naphthalenethiol.

2. In the process of producing a polysulfone resin formed by the interaction of sulfur dioxide and an unsaturated organic compound, wherein the unsaturation is an olefinic double bond between two adjacent carbon atoms and which will polymerize with sulfur dioxide to form a resin, the improvement which comprises admixing a material selected from the group consisting of 1-naphthalenethiol and 2-naphthalenethiol with said resin during its preparation.

3. In the process of producing a polysulfone resin formed by the interaction of sulfur dioxide and an unsaturated organic compound, wherein the unsaturation is an olefinic double bond between two adjacent carbon atoms and which will polymerize with sulfur dioxide to form a resin, the improvement which comprises admixing a material selected from the group consisting of 1-naphthalenethiol and 2-naphthalenethiol with an acid latex of said resin.

4. The process of claim 1 wherein the material added is 1-naphthalenethiol.

5. The process of claim 4 wherein the 1-naphthalenethiol is added in an amount of from about 0.2 to about 10 weight per cent of said resin.

6. The process of claim 1 wherein the material added is 2-naphthalenethiol.

7. The process of claim 6 wherein the 2-naphthalenethiol is added in an amount of from about 0.2 to about 10 weight per cent of said resin.

8. In the process producing a thermally stable olefin-sulfur dioxide resin, the step which comprises admixing a material selected from the group consisting of 1-naphthalenethiol and 2-naphthalenethiol with said resin.

9. A composition comprising a polysulfone resin, formed by the interaction of sulfur dioxide and an unsaturated organic compound wherein the unsaturation is an olefinic double bond between two adjacent carbon atoms and which will react with sulfur dioxide to form a resin, and a material selected from the group consisting of 1-naphthalenethiol and 2-naphthalenethiol.

10. The composition of claim 9 wherein the material is 1-naphthalenethiol.

11. The composition of claim 9 wherein the material is 2-naphthalenethiol.

12. A latex comprising an aqueous emulsion of the reaction product of sulfur dioxide and an unsaturated organic compound, wherein the unsaturation is an olefinic double bond between two adjacent carbon atoms and which will polymerize with sulfur dioxide to form a resin, and a material selected from the group consisting of 1-naphthalenethiol and 2-naphthalenethiol.

13. The composition of claim 12 wherein the material is present in an amount of about 0.2 to 10 weight per cent of said resin.

14. The composition of claim 13 wherein the material is 1-naphthalenethiol.

15. The composition of claim 13 wherein the material is 2-naphthalenethiol.

16. A thermally stable olefin-sulfur dioxide resin composition comprising an olefin-sulfur dioxide resin having incorporated therewith as stabilizing agent a material selected from the group consisting of 1-naphthalenethiol and 2-naphthalenethiol.

17. The composition of claim 16 wherein the stabilizing agent is 1-naphthalenethiol.

18. The composition of claim 16 wherein the stabilizing agent is 2-naphthalenethiol.

19. The process of claim 1 wherein the unsaturated organic compound is 1-butene.

20. The process of claim 1 wherein the unsaturated organic compound is 2-butene.

21. The process of claim 1 wherein the unsaturated organic compound is 1-pentene.

22. The process of claim 1 wherein the unsaturated organic compound is cyclohexene.

23. The process of claim 1 wherein the unsaturated organic compound is dodecene.

24. A composition comprising a polysulfone resin, formed by the interaction of sulfur dioxide and an unsaturated organic compound wherein the unsaturation is an olefinic double bond between two adjacent carbon atoms and which will react with sulfur dioxide to form a resin, and about 0.2 to 10 weight per cent of said resin of 1-naphthalenethiol.

25. A composition comprising a polysulfone resin, formed by the interaction of sulfur dioxide and an unsaturated organic compound wherein the unsaturation is an olefinic double bond between two adjacent carbon atoms and which will react with sulfur dioxide to form a resin, and about 0.2 to 10 weight per cent of said resin of 2-naphthalenethiol.

26. A composition comprising a polysulfone resin and about 0.2 to 10 weight per cent of said resin of 1-naphthalenethiol.

27. A composition comprising a polysulfone resin and about 0.2 to 10 weight per cent of said resin of 2-naphthalenethiol.

28. A composition comprising a polysulfone resin and a material selected from the group consisting of 1-naphthalenethiol and 2-naphthalenethiol.

No references cited.